United States Patent [19]
Inoue

[11] Patent Number: 5,414,629
[45] Date of Patent: May 9, 1995

[54] NAVIGATION SYSTEM WITH ROUTE DETERMINATION PROCESS CAPABLE OF DETERMINING A DESIRED ROUTE READILY AND CORRECTLY

[75] Inventor: Nobutaka Inoue, Aichi, Japan

[73] Assignee: Masprodenkoh Kabushikikaisha, Japan

[21] Appl. No.: 154,816

[22] Filed: Nov. 19, 1993

[30] Foreign Application Priority Data

Mar. 31, 1993 [JP] Japan .................................. 5-073853

[51] Int. Cl.6 ........................................... G06F 15/50
[52] U.S. Cl. ..................... 364/444; 364/449; 340/995
[58] Field of Search ............... 364/444, 449, 460, 462; 340/988, 995; 342/357, 457

[56] References Cited

U.S. PATENT DOCUMENTS

| | | | |
|---|---|---|---|
| 4,403,291 | 9/1983 | Von Tomkewitsch | 364/424.02 |
| 4,550,317 | 10/1985 | Moriyama et al. | 340/995 |
| 4,689,747 | 8/1987 | Kurose et al. | 364/449 |
| 4,796,189 | 1/1989 | Nakayama et al. | 364/449 |
| 4,879,658 | 11/1989 | Takashima et al. | 364/449 |
| 4,882,689 | 11/1989 | Aoki | 364/449 |
| 4,926,336 | 5/1990 | Yamada | 364/444 |
| 4,943,925 | 7/1990 | Moroto et al. | 364/449 |
| 5,067,082 | 11/1991 | Nimura et al. | 364/449 |
| 5,121,326 | 6/1992 | Moroto et al. | 364/449 |
| 5,168,452 | 12/1992 | Yamada | 364/444 |
| 5,184,123 | 2/1993 | Bremer et al. | 340/995 |
| 5,220,507 | 6/1993 | Kirson | 364/444 |
| 5,231,584 | 7/1993 | Nimura et al. | 364/444 |
| 5,272,638 | 12/1993 | Martin et al. | 364/444 |
| 5,274,387 | 12/1993 | Kakihara et al. | 342/451 |

FOREIGN PATENT DOCUMENTS

| | | |
|---|---|---|
| 0158214 | 10/1985 | European Pat. Off. . |
| 0323230 | 5/1989 | European Pat. Off. . |
| 0323246 | 7/1989 | European Pat. Off. . |
| 0348528 | 1/1990 | European Pat. Off. . |
| 0485120 | 5/1992 | European Pat. Off. . |
| 1136300 | 11/1978 | Japan . |
| 1130299 | 1/1987 | Japan . |
| 63-188517 | 5/1989 | Japan . |
| 2079453 | 1/1982 | United Kingdom . |
| 2111204 | 6/1983 | United Kingdom . |
| 2238870 | 11/1989 | United Kingdom . |
| 93/09510 | 5/1993 | WIPO . |

*Primary Examiner*—Michael Zanelli
*Attorney, Agent, or Firm*—Davis, Bujold & Streck

[57] ABSTRACT

A navigation system includes a display, a map data storage device, a display control device, an intersection numbering device, a number indication control device, an intersection number input device, and a route determination device. The intersection numbering device prepares intersection numbers with respect to each intersection included in map data stored in the map data storage device. The number indication control device identifies each intersection on a road map displayed on a screen by indicating each displayed intersection with a respective intersection number. A user can specifically designate desired route intersections by inputting the corresponding intersection numbers indicated on the screen. Thus, a desired route can be readily and correctly determined. Since the map data does not originally contain the intersection numbers, the map data is small in volume, and a wide variety of map data, such as those with a different display color or layout, can be used for the navigation system.

13 Claims, 6 Drawing Sheets

| INTERSECTION NUMBER (j) | 1 | 2 | | 20 |
|---|---|---|---|---|
| INTERSECTION ADDRESS | C101 | C102 | | C205 |
| LONGITUDE (x-COORDINATE) | x101 | x102 | | x205 |
| LATITUDE (y-COORDINATE) | y101 | y102 | | y205 |
| ADDRESS OF NEXT INTERSECTION | C2 C71 C102 C101 | C3 C51 | | C36 C21 C25 |
| NODE LIST | N1 N2 | | | |
| REGISTERED INTERSECTION | P1 | P2 | | P4 |

NAVIGATION SYSTEM WITH ROUTE DETERMINATION PROCESS CAPABLE OF DETERMINING A DESIRED ROUTE READILY AND CORRECTLY

BACKGROUND OF THE INVENTION

This invention relates to a navigation system for a motor vehicle by which a route to be taken is displayed by a cathode ray tube CRT screen, a liquid crystal display, or another display means to navigate the vehicle. More particularly, this invention relates to such a navigation system provided with a route determination process by which a desired route can be determined readily and correctly.

A known navigation system is provided with a screen on which a road map is displayed. In one type of such a system, a route is determined by pinpointing and thereby inputting, with a cursor on the screen or by means of a light pen, desired intersections on the displayed road map consecutively from a starting point to a destination. In another type of system, once a starting point and destination are input, a shortest route from the starting point to the destination is automatically determined, according to map data previously stored, and indicated on the road map displayed by the screen.

These types of navigation systems, however, have the following shortcomings.

During route determination using the former type of navigation system, if there lies ahead, in the direction designated by the cursor or light pen, an intersection of roads that form a small angle with regard to each other or an intersection of a plurality of roads, an undesired route may be determined. In this case, the user has to return the cursor or other designating means to the previous location, and again instruct the system to determine a route.

On the other hand, the latter type of system also falls short, in spite of its operation facility, because it uses previously stored and not up-dated program data in determining a route. When unexpected repair work is underway at the automatically selected route, or when the route the user preferred is not selected, the user has to correct the route, after completion of the automatic route determination, in the same laborious manner as in the former type of navigation system.

SUMMARY OF THE INVENTION

Wherefore, an object of the present invention is to provide a navigation system for vehicles where and by which a desired route can be readily and quickly determined.

Figure 1:
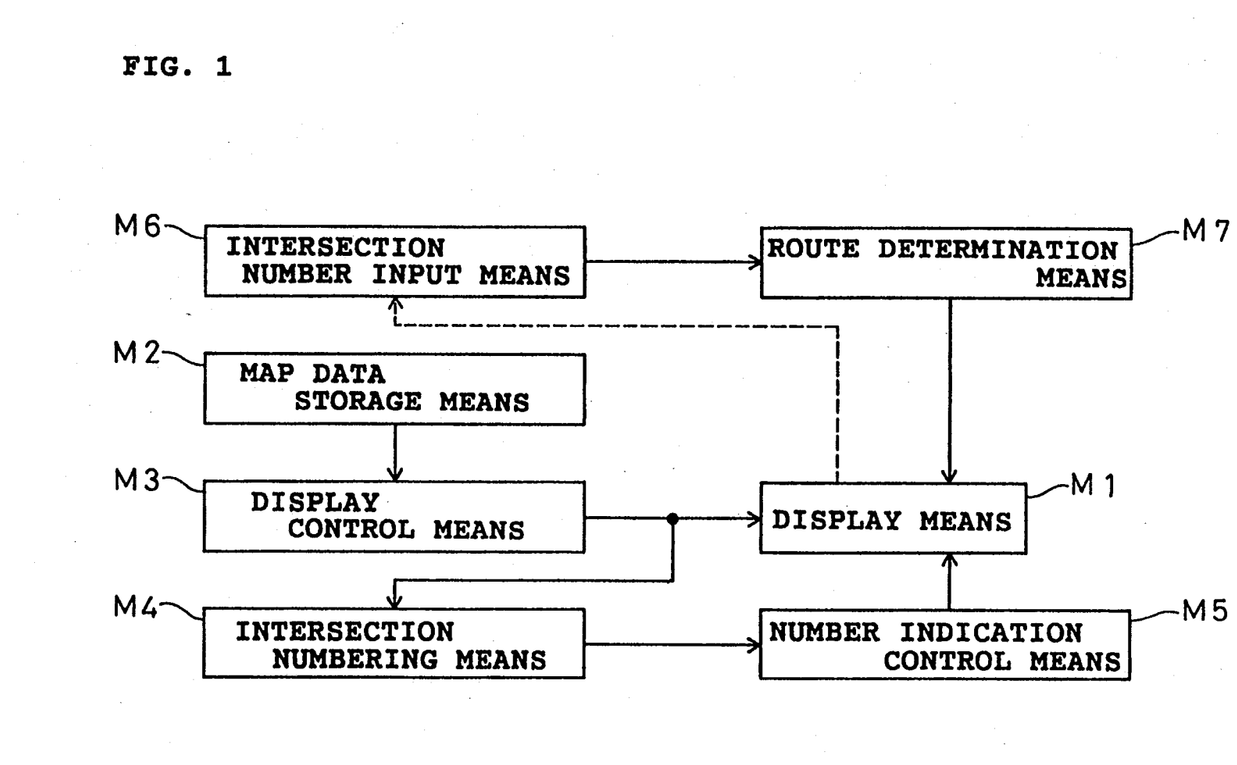
FIG. 1 is a block diagram schematically showing the navigation system of the present invention.

In order to attain the stated object, the navigation system of the present invention includes, as shown in FIG. 1, display means M1, map data storage means M2, display control means M3, intersection numbering means M4, number indication control means M5, intersection number input means M6, and route determination means M7.

The display means M1 displays a road map thereon.

The map data storage means M2 stores map data for providing a road map to be displayed by the display means M1.

The display control means M3 controls the display means M1 to display a road map according to the map data stored in the map data storage means M2.

The intersection numbering means M4 prepares intersection numbers by numbering each intersection included in the road map displayed by the display means M1.

The number indication control means M5 controls the display means M1 to indicate the intersection number in the vicinity of the respective intersection on the road map displayed by the display means M1.

The intersection number input means M6 inputs a given intersection number from among the intersection numbers indicated on the display means M1.

The route determination means M7 stores as a route each road between the intersections corresponding to the intersection numbers input by the intersection number input means M6, and cognizably indicates each road as a route on the road map displayed by the display means M1.

In operation, the display control means M3 first displays on the display means M1 a road map according to the map data stored in the map data storage means M2. The intersection numbering means M4 then prepares intersection numbers with respect to each intersection on the road map displayed on the display means M1. Next, the number indication control means M5 causes the display means M1 to indicate the intersection numbers prepared by the intersection numbering means M4 on the road map in the vicinity of their respective intersection.

Subsequently, intersections on a desired route are consecutively designated by inputting, via the intersection number input means M6, the corresponding intersection numbers from among those indicated by the number indication control means M5 on the display means M1. Consequently, the route determination means M7 stores as a route each road located between the designated intersections identified by the intersection numbers, and cognizably indicates each road as a route on the road map displayed on the display means M1.

BRIEF DESCRIPTION OF THE DRAWINGS

The present invention will now be described, by way of example, with reference to the drawings, in which.

DETAILED DESCRIPTION OF THE PREFERRED EMBODIMENT

An embodiment of the present navigation system is explained hereunder referring to the drawings although it is understood that other embodiments are within the scope of the present invention.

Figure 2:
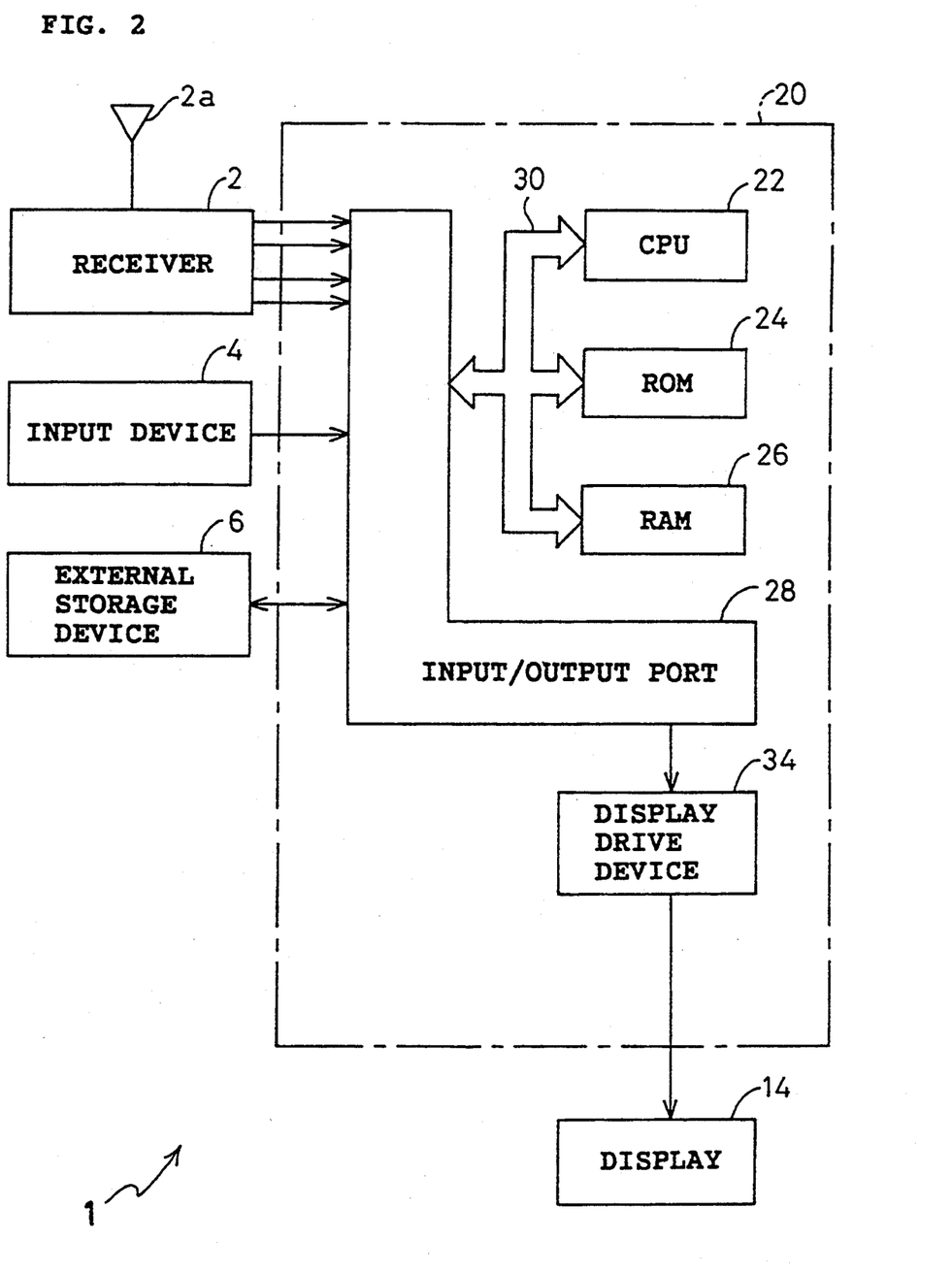
FIG. 2 is a block diagram schematically showing a navigation system of the preferred embodiment as a whole.

As shown in FIG. 2, a navigation system 1 according to the present embodiment includes an antenna 2a and a known receiver 2 for receiving signals transmitted from an artificial satellite that is part of the Global Positioning System GPS. Diffusion conversion is performed on the received signals to obtain longitude data, latitude data, and altitude data indicative of the location where the signal is received, i.e. current position of the vehicle, and velocity data indicative of the traveling velocity of the received location, i.e. driving velocity of the vehicle.

The navigation system 1 also includes an input device 4, as intersection number input means M6, for externally inputting the intersection numbers, a base point from which to start the navigation, and other instructions such as cancellation of the determined route.

The navigation system 1 also includes an external storage device 6, a display drive device 34, and a display 14. The external storage device 6 may be an optical disc or magnetic disc and serves as a map data storage means M2. The display 14 may include a cathode ray tube CRT, a liquid crystal screen, or other display means and displays a road map and other necessary information.

The navigation system 1 further includes a main controller 20. The main controller 20 retrieves data from the receiver 2, the input device 4, the external storage device 6, and other parts of the navigation system 1, and controls the display 14 to indicate a road map and a determined route based on the data retrieved.

Figure 5:
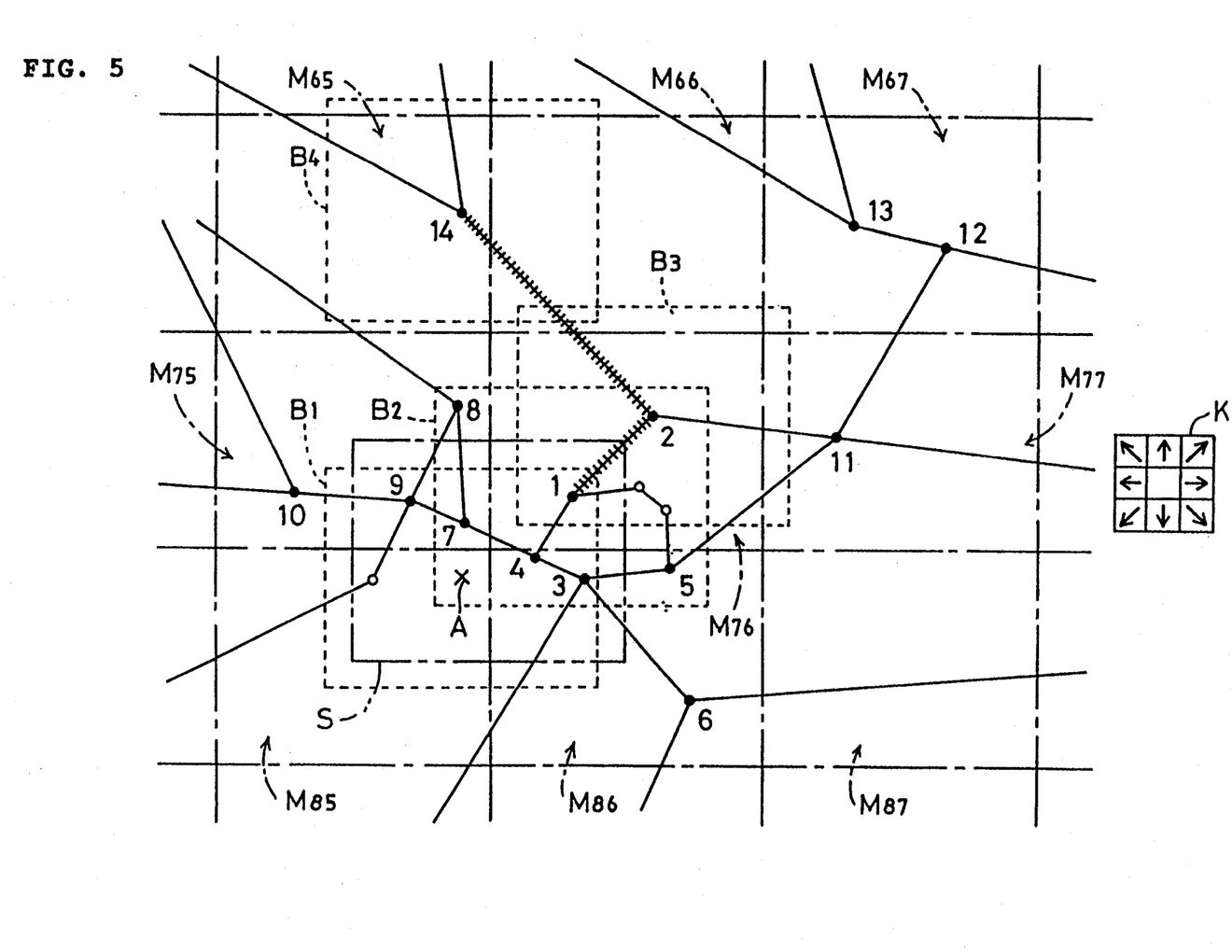
FIG. 5 is an illustration showing how the route determined at the route determination process is indicated on the road map displayed by the display.

As shown by chain lines in FIG. 5, the map data stored in the external storage device 6 takes the form of n×m units of map data M11, M12, ... Mnm, each unit of map data corresponding to the size of the map that the screen of the display 14 can show at one time. The external storage device 6 also stores intersection data prepared with respect to each intersection included in the map data for providing data to be used in the route determination and the route indication.

Figure 3:
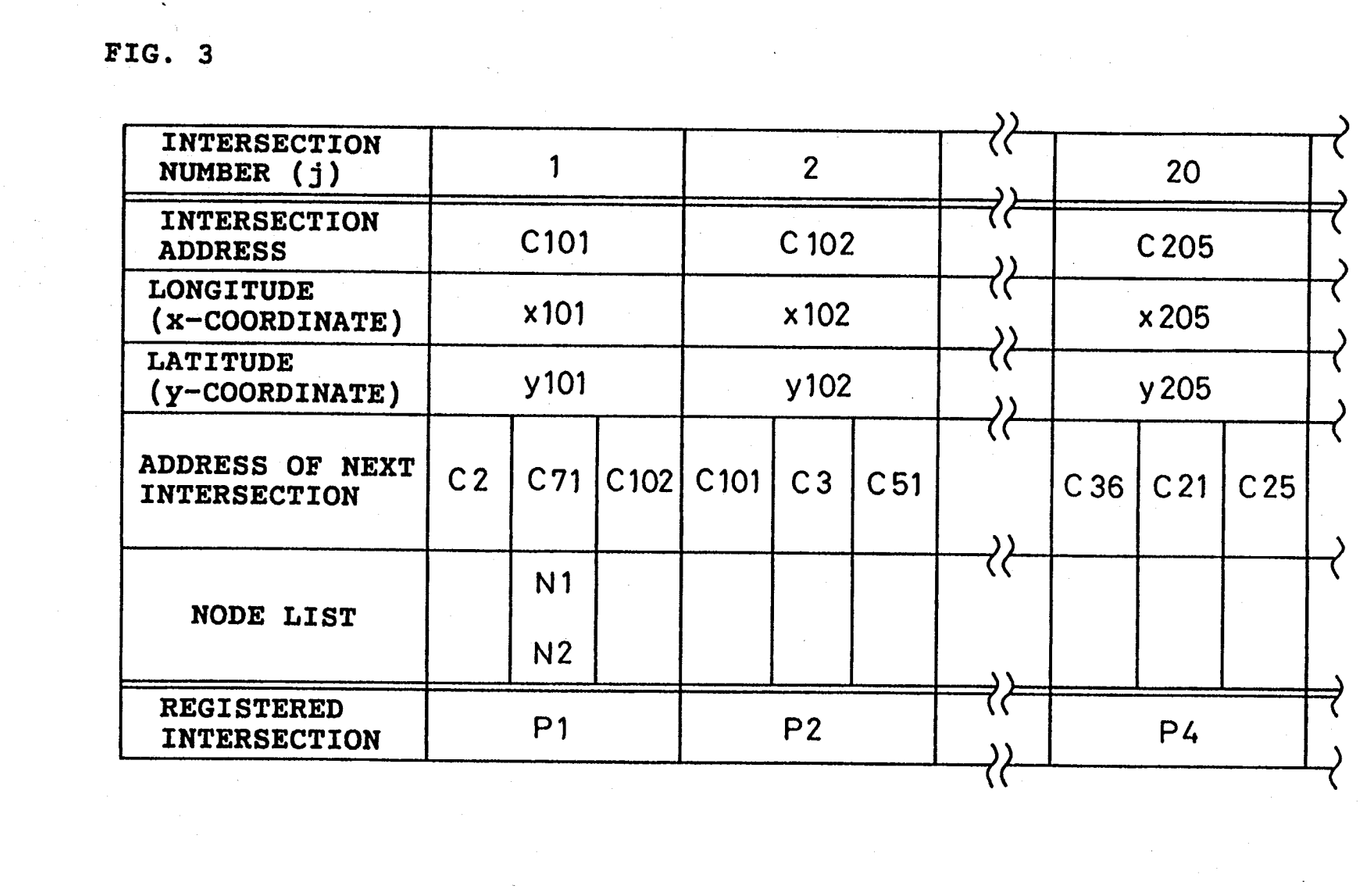
FIG. 3 is table illustrating intersection data used in route determination.

The intersection data, as shown in FIG. 3, includes an intersection address Ci (i: integer value from 1 to n) for each intersection in the map data, longitude (x-coordinate) data and latitude (y-coordinate) data indicative of the location of the intersections, intersection addresses Ci of next intersections, a node list indicative of inflection point(s) between each intersection and corresponding next intersections.

As a result of the route determination process described later in detail, each intersection address included in the intersection data is provided with a respective intersection number and thereby identified. Further, the intersection address Ci corresponding to the intersection on a determined route is consecutively stored as a registered route intersection Pi.

The main controller 20 is a known microcomputer including a CPU 22, a ROM 24, a RAM 26, an input-/output port 28, and a bus line 30 connecting these components. The main controller 20 is provided with a display drive device 34 which sends out drive signals to and thereby activates the display 14. In response to a command input by a user at the input device 4, the main controller 20 executes a corresponding process of either route determination or navigation.

Figure 4A:
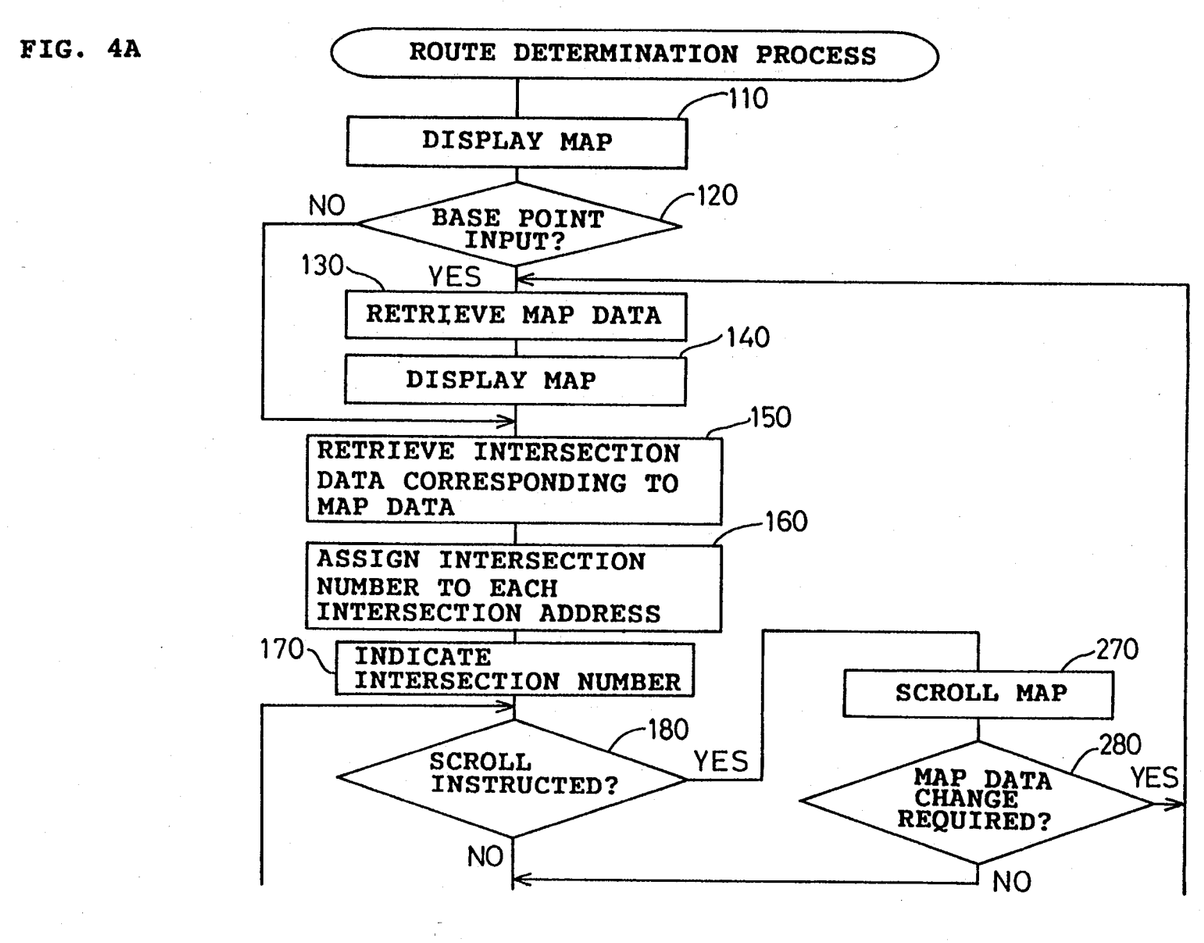
FIGS. 4A and 4B are flow diagrams which together show the route determination process of the present invention.
Figure 4B:
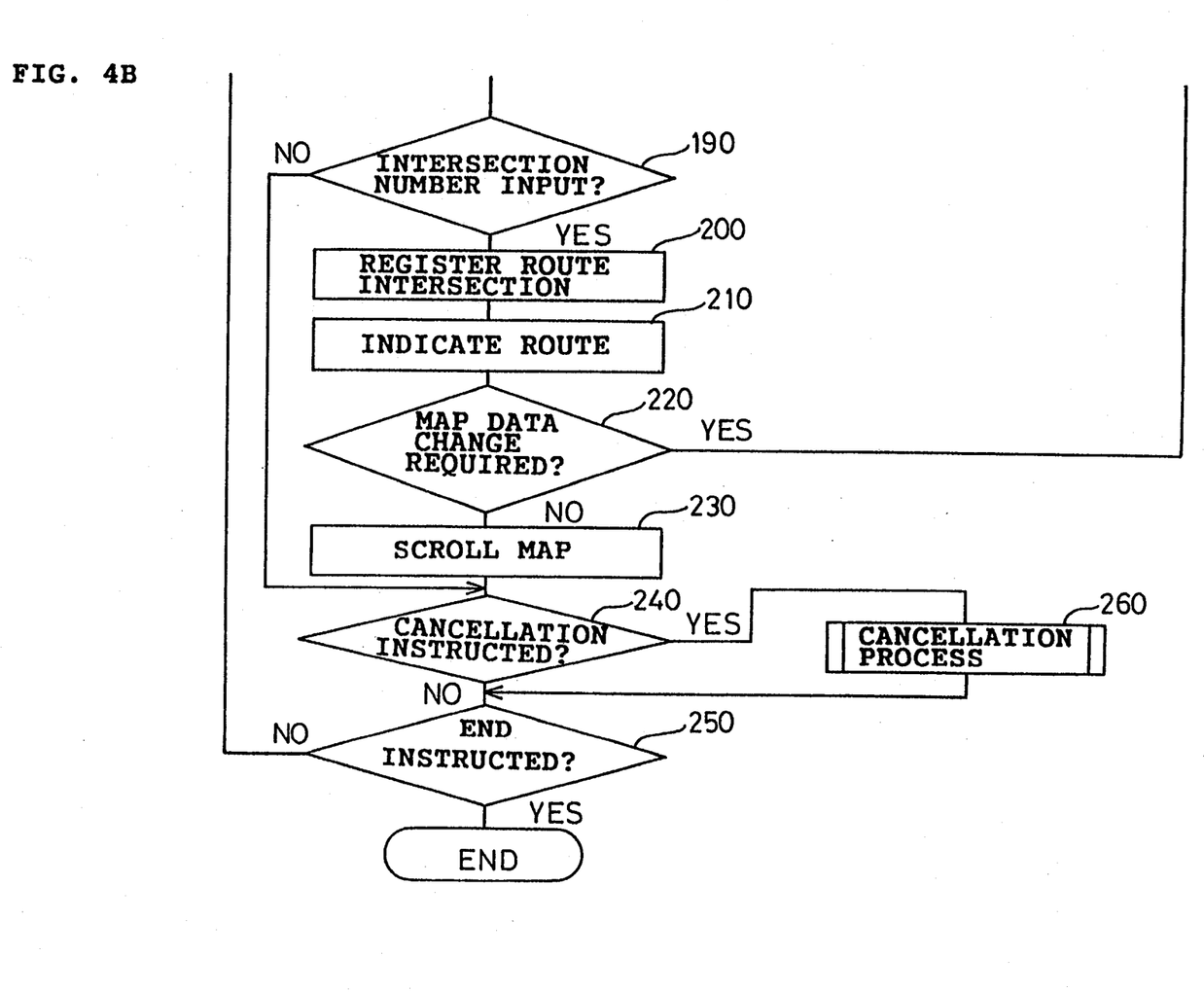

During the navigation process, the current position of a moving vehicle is continually detected and indicated on a road map displayed by the display 14, and the route determined at the route determination process is indicated, referring to the intersection address Ci registered as a route intersection, on the road map to guide a driver. Further details of the navigation process are irrelevant to the present invention and are therefore omitted for simplification As shown in FIGS. 4A and 4B, in response to a command to start the route determination process, a road map is displayed by the display 14 according to the map data currently stored in the RAM 26, step 110. Therefore, if the navigation process has been performed prior to the instant process, the same road map as that displayed by the display 14 during the prior navigation process is again displayed by the display 14.

At the following step 120, it is determined whether any information concerning the area from which to start route determination has been input. If "YES" is determined, the flow proceeds to step 130.

In order to designate the base point, a wide area map may be first displayed, which is next gradually zoomed by pointing with a cursor to obtain a more detailed map on which the user locates and inputs a base point. Alternatively, the information input may be in the form of, for example, longitude and latitude value data of the base point, or x-coordinate and y-coordinate data of any landmark building nearby the base point.

At step 130, map data, including the base point input at step 120, is retrieved from the external storage device 6 to the RAM 26. During data retrieval, a unit of map data including the base point, which is referred to as the central unit map hereinafter, is first retrieved from among all the units of map data M11–Mnm, and subsequently, three units of map data are retrieved. The three units of map data, which are referred to as peripheral unit maps hereinafter, correspond to the areas which are adjacent to the central unit map and lie in the driving direction. The four unit maps, including the central unit map and the three adjacent peripheral unit maps, are then stored in the RAM 26. At the next step 140, display data is prepared and a road map is thereby displayed by the display 14. The road map that is displayed by the display 14 at step 110 is also prepared from the four unit maps stored in the RAM 26 at that time.

Thus, the process at steps 110, 130, and 140 serve as the display control means M3.

For instance, if the information for point A in FIG. 5 is input as information designating the base area, a central unit map M85 including the point A and the three peripheral unit maps M75, M76, and M86 are retrieved. The three peripheral unit maps M75, M76, and M86, which are respectively situated above, above and to the right, and to the right of the central unit map M85, are selected based on the location of point A relative to the center of the central unit map M85. At the next step 140, the display data is prepared from the four unit maps with the point A at its center, thereby displaying a road map of range B1 shown by dashed lines in FIG. 5.

If the information concerning the base area was not input at step 120, or after displaying a road map of the base area by the display 14 at step 140, the process goes to step 150 where intersection data corresponding to the four units of map currently stored in the RAM 26 is retrieved. At the next step 160, an intersection number j is prepared with respect to each intersection address Ci. The process at step 160 thus serves as intersection numbering means M4.

The intersection number j is a sequential number from 1 to 99 and is temporarily given to each intersection address Ci retrieved. When the four unit maps stored in the RAM 26 are repeatedly changed by a process which will be later explained and as a result the intersection number reaches 99, further intersection numbers again start from 1.

Subsequently, step 170 serves as number indication control means M5 so as to indicate the prepared intersection numbers adjacent their corresponding intersections on the road map displayed by the display 14.

For instance, when the RAM 26 currently stores unit maps M85, M75, M76, and M86 shown in FIG. 5 with the display 14 displaying a road map of range B1, intersection numbers j from 1 to 10 are temporarily registered for the corresponding ten intersections included in the four unit maps M85, M75, M76, and M86. From among the ten intersection numbers j now registered, the intersection numbers j of 1, 3, 4, 7, and 9 are displayed adjacent the corresponding intersections on the road map displayed by the display 14. Encircled points in FIG. 5 do not represent intersections, but represent inflection points Ni on a road between intersections.

Upon indication of intersection numbers, the process step goes to step 180 where it is examined if an instruction to scroll the road map shown on the display 14 has been input via arrow keys K, shown also in FIG. 5, provided on the input device 4. If "NO" is determined, the flow goes to step 190.

At step 190, it is examined if an intersection number j has been input and designated by numeral keys provided on the input device 4. If it is determined that an intersection number j has been input, the intersection corresponding to the designated intersection number j is registered, step 200, as an intersection on the route, which is hereinafter referred to as a "route intersection". This registration of a route intersection is performed by storing each registered route intersection number Pi for the intersection address Ci corresponding to the designated intersection number j.

At the next step 210, the road between the intersection previously designated and the intersection designated this time is indicated as a route on the road map displayed by the display 14. The route indication is performed by accentuating the route with different color, boldness of line, type of line or other appropriate variation.

The process at steps 200 and 210 thus serves as route determination means M7.

When the route indication is completed, it is next examined at step 220 if the map data stored in the RAM 26 is to be changed. Determination at step 220 is made according to whether the route intersection registered this time is within the area S shown by double-dashed lines in FIG. 5. The area S is concentric with the combined area defined by the four units of map now stored in the RAM 26, and corresponds to the size of the road map that the screen of the display 14 can show at one time. When it is determined that the route intersection registered this-time is beyond the area S, the map data is changed and the process goes to step 130. At step 130, a central unit map including the route intersection registered this time and three peripheral unit maps are retrieved. At the subsequent step 140, a road map, with the route intersection registered this time at its center, is displayed. At the following steps 150-170, intersection data corresponding to the four units of map data newly retrieved by the RAM 26 are retrieved, intersection number j is prepared for each intersection address Ci, and the intersection numbers thus prepared are indicated on the road map displayed by the display 14.

On the other hand, if it is determined at step 220 that the route intersection registered this time is within the area S, the map data is not changed, the flow proceeds directly to step 230, and the current road map is scrolled, without changing the map data, so as to situate the route intersection registered this time at the center of the screen of the display 14.

For instance, when a road map of the range B1 shown in FIG. 5 is currently displayed and an intersection number j of 1 is input, the intersection identified by the intersection number 1 is within the area S. Therefore, the map data now stored in the RAM 26 is not required to be changed, and a road map of range B2 is displayed by the display 14 with the intersection corresponding to the intersection number 1 situated at its center. Responsively, the intersection numbers 1-5, 7, and 8, from among all the registered intersection numbers, are indicated adjacent their respective intersections displayed by the display 14.

On the other hand, when the intersection corresponding to the intersection number 1 is registered as a route intersection and the intersection number 2 is next input, the intersection corresponding to the intersection number 2 is beyond the area S. Therefore, the process goes back to step 130.

At step 130, peripheral unit maps M66, M67, and M77 are retrieved, recognizing as a central unit map the unit map M76 including the intersection corresponding to the intersection number 2, from the external storage device 6 to the RAM 26, thereby displaying on the display 14 a road map of range B3 shown by dashed lines in FIG. 5 with the intersection corresponding to the intersection number 2 at its center. Further, intersection numbers 11-13 are registered for the three additional intersections included in the newly retrieved peripheral unit maps M66, M67, and M77. Thus, the RAM 26 always stores four pieces of unit maps retrieved from the external storage device 6, thereby allowing an expedited change of road map to be displayed by the display 14.

Following step 230, where a road map is displayed by the display 14 with the registered route intersection at its center, or following step 190 determining that intersection number j is not designated, the flow goes to step 240 to determine whether a cancellation instruction has been input through a cancel key provided on the input device 4. If it is determined that no cancellation is instructed, it is next determined at step 250 whether an instruction has been input via the input device 4 to end the route determination process.

If "YES" is determined at step 250, the process step ends. If "NO" is determined at this step, the process goes back to step 180 and awaits an instruction either to scroll the displayed road map, designate an intersection number j, or to cancel the determined route.

On the other hand, if it is determined at step 240 that cancellation of the determined route is instructed, the flow goes to step 260 and a cancellation process is performed in the following manner to cancel the determined route.

First, the number of times the cancellation instruction is input, i.e. the number of times the cancel key was operated, is counted. The registration of the corresponding number of route intersections are next deleted. Consequently, the indication of the route between the deleted route intersections is erased. Processes similar to those at steps 130 and 140 are performed after the route cancellation, thereby displaying on the display 14 a road map situating at its center the last route intersection that is not canceled.

When it is determined at step 180 that an instruction is input to scroll the displayed road map, the process step goes to step 270, and the displayed road map is scrolled in the direction designated by an arrow key. Subsequently, it is determined at step 280 whether the currently stored map data needs to be changed. The determination is made, similarly to step 220, according to whether the center of the road map now displayed by the display 14 is within the area S defined by the four units of map data currently stored in the RAM 26. When it is determined that no change of map data is required, i.e. the center of the displayed road map is within the area S, the process goes directly to step 190. When it is determined that the map data needs to be changed, i.e. the center of the displayed road map is beyond the area S, the process goes back to step 130 in the same manner as in step 220. Thereby, a central unit map, situating at its center the center of the displayed road map, and peripheral unit maps are retrieved, a corresponding road map, obtained by scrolling the road map for a desired time period with the arrow key, is displayed by the display 14. Intersection numbers j are prepared for the map data newly retrieved by the RAM 26, and consequently the prepared intersection numbers j are indicated on the road map displayed by the display 14.

For example, when a road map of range B3 shown in FIG. 5 is currently displayed by the display 14 with the intersections corresponding to intersection numbers 1 and 2 registered as route intersections, operation of an arrow key pointing above and to the left direction on the map results in, as long as the center of the road map to be newly displayed is within the area S as defined by the unit maps M76, M66, M67, and M77, scrolling of the displayed road map up and to the left without changing the map data. When that arrow key is further operated and the center of the road map to be newly displayed goes beyond the area S, the processes at steps 130–170 are performed. Thereby, a central unit map M76 and peripheral unit maps M66, M65, and M75 are retrieved by the RAM 26, an intersection included in the newly retrieved unit map M65 is temporarily numbered with an intersection number 14, and the displayed road map is scrolled up and to the left. Further, if it is determined at step 190 that an intersection number 14 is input, a road map of range B4, situating at its center the intersection corresponding to the intersection number 14, is displayed by the display 14 as shown in FIG. 5.

Explained hereinafter is a procedure to determine a route using a navigation system constructed according to the embodiment of the present invention.

First, via the input device 4, an instruction is input to start the route determination process. Responsively, a road map is displayed by the display 14 by the process at step 110. If the area shown on the displayed road map differs from the one on which a user desires to determine a route, information is input concerning the area from which to start the route determination. The processes at steps 120–140 are then performed and a road map of the desired area, from which to start the route determination, is displayed by the display 14.

In response to the display of the road map by the display 14, the processes at steps 150–170 are performed and thereby intersection numbers j (j: an integer value from 1 to 99) are indicated adjacent the respective intersections on the displayed road map. If the intersection the user desires to designate as the starting point is not included in the currently displayed road map, an arrow key pointing in a desired direction is depressed. Responsively, the displayed road map is scrolled by the process at steps 180, 270, and 280. When the desired intersection is found on the displayed road map, the intersection number j corresponding to the desired intersection is input via numeral keys provided on the input device 4.

The intersection thus identified and designated by its intersection number j is registered as a route intersection, steps 190–230. Likewise, by repeating the process at steps 240, 250, 180–230, every time the intersection number j is input, the corresponding intersection is registered as a route intersection. Since the route between the registered route intersections is indicated on a real-time basis on the displayed road map, the user can confirm the determined route.

When canceling the thus determined route, a cancel key on the input device 4 is to be operated. Responsively, the processes at steps 240 and 260 are performed, thereby canceling the determined route according to the number of times the cancel key was operated. Even after cancellation of the route, the process step is on a stand-by condition awaiting either a scrolling operation, input of an intersection number j, or an instruction to end the route determination, and the processes at step 180–250 are thus repeated.

Thus, according to the navigation system of the instant embodiment, a desired route is readily and correctly determined since a user can designate desired route intersections by inputting their corresponding intersection numbers j indicated on the display 14.

Moreover, according to the embodied navigation system, the map data itself does not contain any information concerning intersection numbers j. Instead, the present invention constantly prepares and indicates on the displayed road map the intersection numbers j every time units of map data are newly retrieved for obtaining new map data and a new road map. The map data can thus be smaller in volume. Map data with a different display color, layout, or other variation can be adopted for determining a route using the present navigation system.

Also in the embodied navigation system, if an intersection number j reaches 99, the further intersection numbers restarts from 1. The displayed road map can therefore remain easy to see by displaying only a one or two digit intersection number j, not three or more-digit intersection numbers j.

If the map is a detailed one and the four unit maps have a hundred or more intersections on them, the intersections may be numbered by intersection numbers j from 1 to 999, if desired. Alternatively, if an intersection number j reaches 99, a further intersection numbers j may restart from 1 and be indicated with a different color. In this case, in registering a route intersection at step 190 during the route determination, an intersection may be designated by both the intersection number j and a color.

Moreover, since a route is determined intersection by intersection, the distance between a starting point and the destination can be readily and accurately obtained by accumulating the distance between intersections every time a route intersection is registered. Similarly, during driving, the remaining distance to drive from the current position can be easily obtained and indicated.

Further, any desired subsidiary information, such as famous viewpoints or the residence of an acquaintance nearby, may be input at the desired point when registering route intersections by designating a corresponding intersection number j. The subsidiary information may be indicated by the display 14 or announced during driving navigated by the present system.

Wherefore, having described the present invention, what is claimed is:

1. A navigation system for a vehicle comprising:
   display means for displaying a road map thereon;
   map data storage means for storing map data therein and for supplying a road map to be displayed by said display means;
   display control means for controlling said display means to display a desired road map from the map data stored in said map data storage means with intersections on the displayed road map being displayed without an intersection number;
   intersection numbering means for assigning, during operation of said navigation system, an intersection number to each intersection of the road map currently displayed by said display means;
   number indication control means for controlling said display means to indicate the assigned intersection number adjacent each respective intersection of the road map currently displayed by said display means;
   intersection number input means for inputting a desired intersection number from the intersection numbers displayed by said display means; and
   route determination means for storing each road located between the assigned intersection number of a currently inputted intersection and the assigned intersection number of a previously inputted intersection as a route to be taken and for indicating each such road as the determined route on the road map displayed by said display means.

2. A navigation system according to claim 1, wherein said system further includes means for accentuating, on the road map displayed by said display means, the determined route to be taken.

3. A navigation system according to claim 1, wherein said system further includes means for scrolling the displayed road map so that each inputted route intersection is centered on the road map currently displayed by said display means.

4. A navigation system according to claim 3, wherein each road map stored in said map data storage means is divided into a plurality of unit maps and, during retrieval of road map data to be displayed, a central unit map containing a base point and three unit maps adjacent the base point are utilized to generate the road map displayed by said display means.

5. A navigation system according to claim 4, wherein the road map displayed by said display means is approximately the size of a said unit map.

6. A navigation system according to claim 5, wherein said system further includes route cancellation means for sequentially canceling, commencing from a last inputted intersection toward the base point, a desired portion of the previously determined route.

7. A navigation system according to claim 1, wherein said number indication control means numbers consecutively each intersection of the road map displayed by said display means commencing with 1 and, upon numbering the 99th intersection, said number indication control means again commences consecutively numbering the next additional intersection with a 1.

8. A navigation system according to claim 1, wherein said map data storage means is one of an optical disk and a magnetic disk and said display means is one of a cathode ray tube and a liquid crystal screen.

9. A navigation system according to claim 1, wherein said navigation system further comprises a receiver, having an antenna connected therewith, for receiving a transmission signal from a satellite and determining the current position and velocity of the vehicle.

10. A navigation system according to claim 9, wherein said navigation system further comprises a main controller comprising:
    a central processing unit for processing information;
    a ROM for storing information;
    a RAM for storing information;
    an input/output port for inputting and outputting information; and
    a bus line interconnecting said central processing unit, said ROM, said RAM and said input/output port with one another; said main controller communicates with said display control means for controlling said display means; and said main controller receives information, via said input/output port, from said map data storage means, said intersection number input means and said receiver.

11. A navigation system according to claim 1 wherein said intersection numbering means assigning a two digit number to each intersection to be displayed by said display means upon the intersections being displayed by said road map.

12. A navigation system according to claim 1 wherein said intersection numbering means assigning a desired color and two digit number, ranging from 1 to 99, to each intersection to be displayed by said display means immediately prior to each intersection number being displayed on said road map.

13. A method of navigating a vehicle comprising the steps of:
    displaying, with a display means, a road map;
    storing map data in a map data storage means and supplying to said display means a desired road map to be displayed;
    controlling, with a display control means, said display means to display a desired road map from the map data stored in said map data storage means with intersections on the displayed road map being displayed without an intersection number;
    assigning an intersection number, during operation of an intersection numbering means, to each intersection of the road map currently displayed by said display means upon the intersections being displayed on said road map;
    controlling said display means, with a number indication control means, to indicate the assigned intersection number adjacent each respective intersection of the road map currently displayed by said display means;
    inputting, with an intersection number input means, a desired intersection number from the intersection numbers displayed by said display means;
    storing, with a route determination means, each road located between the assigned intersection number of a currently inputted intersection and the assigned intersection number of a previously inputted intersection as a route to be taken; and
    indicating on the road map displayed by said display means each such road as the determined route to be taken.

* * * * *